(12) United States Patent
Pöllny et al.

(10) Patent No.: US 12,479,325 B2
(45) Date of Patent: Nov. 25, 2025

(54) MOTOR VEHICLE HAVING A COMMUNICATION DEVICE, AND METHOD FOR TRANSMITTING A DATA PACKAGE

(71) Applicant: DAIMLER AG, Stuttgart (DE)

(72) Inventors: Oliver Pöllny, Stuttgart (DE); Philipp Schindler, Karlsruhe (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 800 days.

(21) Appl. No.: 17/627,186

(22) PCT Filed: Jul. 13, 2020

(86) PCT No.: PCT/EP2020/069729
§ 371 (c)(1),
(2) Date: Jan. 14, 2022

(87) PCT Pub. No.: WO2021/009108
PCT Pub. Date: Jan. 21, 2021

(65) Prior Publication Data
US 2022/0274501 A1    Sep. 1, 2022

(30) Foreign Application Priority Data
Jul. 17, 2019  (DE) .................. 10 2019 004 999.3

(51) Int. Cl.
*B60L 53/66* (2019.01)
*B60L 53/126* (2019.01)
(Continued)

(52) U.S. Cl.
CPC ............. *B60L 53/66* (2019.02); *B60L 53/126* (2019.02); *B60L 53/18* (2019.02); *H04W 4/44* (2018.02)

(58) Field of Classification Search
CPC ........ H04W 4/44; B06L 53/66; B06L 53/126; B06L 53/18
See application file for complete search history.

(56) References Cited

U.S. PATENT DOCUMENTS 5,696,903 A   12/1997  Mahany
6,253,086 B1   6/2001  Parantainen et al.
(Continued)

FOREIGN PATENT DOCUMENTS

CN    106793181 A    5/2017
DE   102007003003 A1  7/2008
(Continued)

OTHER PUBLICATIONS

International Search Report mailed Aug. 27, 2020 in related/corresponding International Application No. PCT/EP2020/069729.
(Continued)

*Primary Examiner* — Steven S Kelley
(74) *Attorney, Agent, or Firm* — PATENT PORTFOLIO BUILDERS PLLC

(57) ABSTRACT

A motor vehicle includes a communication device for transmitting and receiving data packages. The communication device has at least one wired interface for transmitting a first data package to a base station external to the motor vehicle and at least one receiving device for wirelessly receiving a second data package. The receiving device is designed to receive the second data package from at least one mobile device external to the motor vehicle. The communication device is designed to transmit the wirelessly received second data package as the first data package in a wired manner.

18 Claims, 1 Drawing Sheet

(51) Int. Cl.
  *B60L 53/18* (2019.01)
  *H04W 4/44* (2018.01)

(56) References Cited

U.S. PATENT DOCUMENTS

| | | | |
|---|---|---|---|
| 6,345,186 | B1 | 2/2002 | Schultz et al. |
| 10,356,846 | B2 | 7/2019 | Fertl et al. |
| 10,383,156 | B2 | 8/2019 | Horbatt |
| 10,567,934 | B1* | 2/2020 | Stählin ............... H04W 4/40 |
| 11,026,073 | B2 | 6/2021 | Haubner |
| 2013/0041850 | A1* | 2/2013 | LaFrance ............ B60L 53/67 320/109 |
| 2013/0078945 | A1 | 3/2013 | Avi et al. |
| 2016/0037307 | A1* | 2/2016 | Roth ................. H04W 4/48 709/206 |
| 2016/0150451 | A1 | 5/2016 | Barreto De Miranda Sargento et al. |
| 2016/0339793 | A1* | 11/2016 | Khoo ............... G06Q 20/24 |
| 2017/0101025 | A1* | 4/2017 | Penilla ............. G06Q 20/102 |
| 2017/0150531 | A1* | 5/2017 | Horbatt ............ H04W 24/02 |
| 2018/0176930 | A1* | 6/2018 | Welsch ............. H04W 4/027 |
| 2018/0211534 | A1 | 7/2018 | de Moura |
| 2018/0255508 | A1 | 9/2018 | Lopes et al. |
| 2019/0065951 | A1* | 2/2019 | Luo .................. G08G 1/166 |
| 2019/0126775 | A1* | 5/2019 | Han ................... B60L 3/12 |
| 2019/0382028 | A1* | 12/2019 | Roman .............. B60W 10/22 |
| 2020/0017117 | A1* | 1/2020 | Milton .............. G08G 1/0112 |
| 2020/0259885 | A1* | 8/2020 | Alam ............... G06F 9/5027 |
| 2020/0314609 | A1* | 10/2020 | Harada ............. H04W 4/40 |
| 2021/0082210 | A1* | 3/2021 | Sakr ................ G07C 5/008 |

FOREIGN PATENT DOCUMENTS

| | | |
|---|---|---|
| DE | 102012208641 A1 | 11/2013 |
| DE | 102017222905 A1 | 6/2019 |
| EP | 2487839 A1 | 8/2012 |
| JP | 2001053662 A | 2/2001 |
| WO | 2011038777 A1 | 4/2011 |

OTHER PUBLICATIONS

Office Action created Feb. 29, 2020 in related/corresponding DE Application No. 10 2019 004 999.3.
Written Opinion mailed Aug. 27, 2020 in related/corresponding International Application No. PCT/EP2020/069729.
Office Action dated Sep. 19, 2024 in related/corresponding CN Application No. 202080051037.0.
Office Action dated Feb. 8, 2025 in related/corresponding CN Application No. 202080051037.0.

* cited by examiner

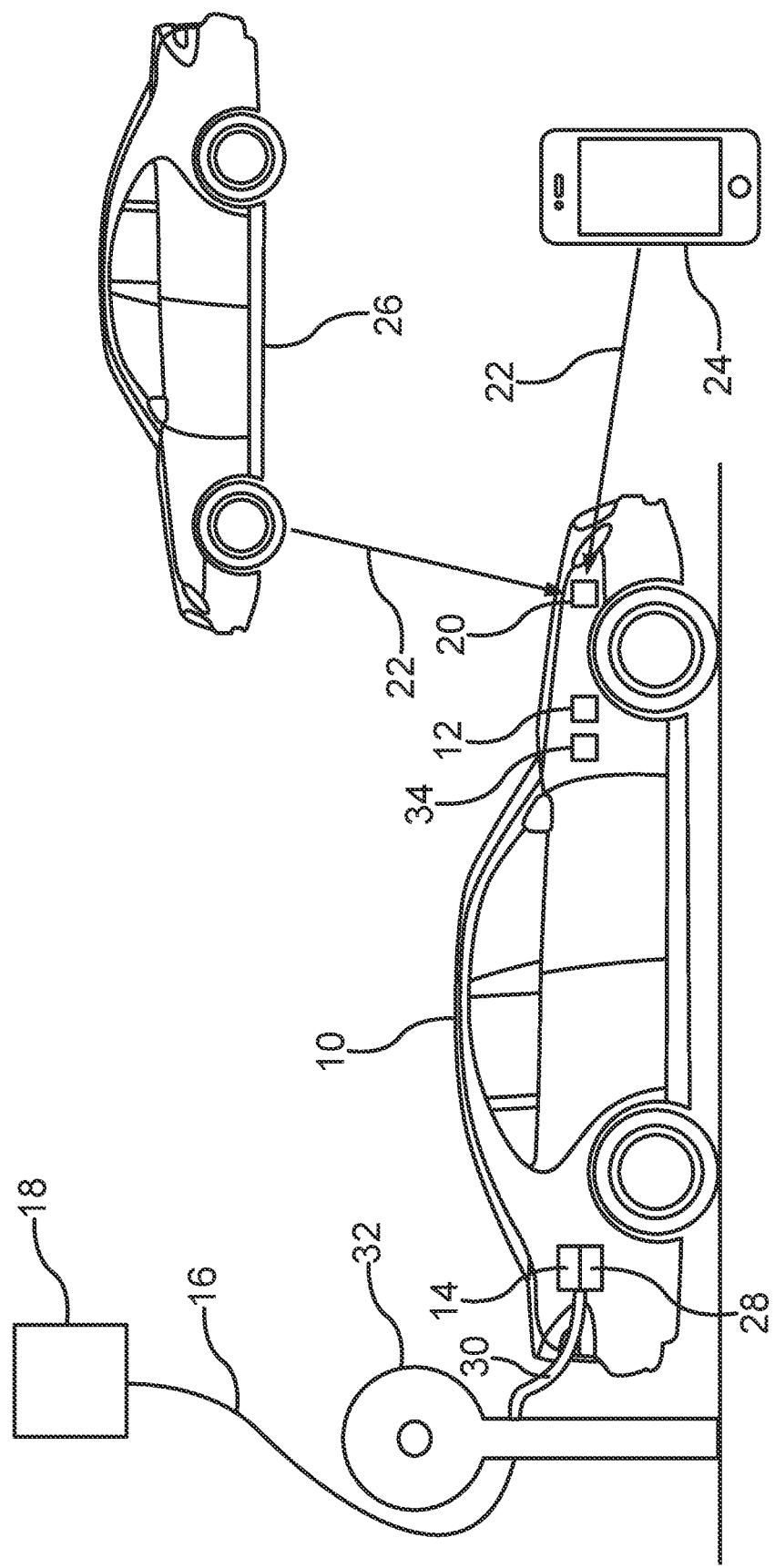

MOTOR VEHICLE HAVING A COMMUNICATION DEVICE, AND METHOD FOR TRANSMITTING A DATA PACKAGE

BACKGROUND AND SUMMARY OF THE INVENTION

Exemplary embodiments of the invention relate to a motor vehicle having a communication device for transmitting and receiving data packets, as well as to a method for transmitting a data packet.

Radio shadows from mobile telephone masts and regions with poor coverage, for example produced by gullies between buildings, and in particular regions in which the available base station does not allow any new connections since it is working at capacity, for example, can be compensated for via the operation of further base stations. For example, here it is known that femtocells or picocells are used in multi-story car parks, for example, in order to increase the availability of a mobile phone network.

Furthermore, US 2016/0150451 A1 discloses a wireless network router for a vehicle and an operation method for this, comprising: a multiple connection interface for wireless access in vehicle surroundings; a wireless local network; a mobile network data interface; a downlink data connection for the vehicle and/or user in the vehicle and in its surroundings; a data processing unit for routing data between the interfaces; wherein the data processing unit is configured: to calculate a point number for each achievable network; switching the uplink connection of the data router of the wireless network to the achievable network with the best point number. Moreover, a wireless network router for vehicles for connecting vehicles to the internet via a multi-network device is proposed, wherein the router is a mobile router suitable for forming a network of connecting vehicles, wherein the router is arranged for use by parked vehicles for redirecting signals from fixed hotspots.

Exemplary embodiments of the present invention are directed to a motor vehicle and a method by means of which improved coverage in topographically difficult areas with mobile telephone technology is made possible.

An aspect of the invention relates to a motor vehicle having a communication device for transmitting and receiving data packets, wherein the communication device has at least one wired interface for transmitting a first data packet to a base station external to the motor vehicle and at least one receiving device for wirelessly receiving a second data packet.

It is provided that the receiving device is designed to receive the second data packet from at least one mobile device external to the motor vehicle, and the communication device is designed to transmit the wirelessly received second data packet as the first data packet in a wired manner.

The invention is therefore particularly useful should the motor vehicle be in a parked state, for example, and have a wired connection to the base station external to the motor vehicle, such that this wired connection is used in order to transmit the second data packet from a mobile device. In other words, the motor vehicle is provided as an intermediary base station. The data packet can be, in particular, data for communication, in particular for speech communication.

Thus, better coverage of topographically difficult regions with mobile telephone technology can be made possible. Furthermore, a better utilization of the motor vehicles can be achieved.

In particular, the motor vehicle is thus temporarily provided as a mobile telephone base station. The motor vehicle here accepts data and, in particular, speech communication on the mobile telephone frequency and immediately routes this in a wired manner to the base station external to the motor vehicle, wherein further processing is only carried out there.

Here, the motor vehicle uses antennae already present in the motor vehicle, in particular, in particular receiving devices, and a present mobile radio module in order to identify itself as a base station when at a standstill. Here, the motor vehicle does not evaluate data, but rather transmits it outwardly only directly via the wired interface. The real base station, i.e., the base station external to the motor vehicle, of the mobile radio provider generally uses adaptive sending power and will reduce its sending strength in this region. Thus, no conflicts emerge as a result of simultaneous transmission on the same frequency. In particular, since the receiving devices of the motor vehicle clearly allow more sending power than a mobile device, power reduced by the real base station is also not a problem in the region for this process.

A further motor vehicle, for example, can be seen as the mobile device. Furthermore, a mobile phone or a tablet can also be seen as the mobile device, which can then in turn be dialed into the motor vehicle as the base station.

In particular, it can further be provided for this that further motor vehicles are connected as mobile devices via a network according to the mesh standard. Here, all available types of connection, such as WLAN, mobile radio, or Ethernet, for example, are treated equally and the respectively expedient type of connection is used and shared with all other participants of the mesh network. Thus, when the motor vehicle just has the wire-bound or wired connection to the base station external to the motor vehicle, for example, then motor vehicles within range can also use this line via a WLAN instead of the mobile radio connection. Thus, it is possible for a quicker data usage, in particular, to be able to be achieved by the further vehicle because short paths between the motor vehicle and the further motor vehicle are formed.

By crosslinking the motor vehicles, alternative up- and downlinks are provided and thus a speed- and cost-improving connection for the motor vehicles is implemented.

According to an advantageous embodiment, the motor vehicle is designed as an at least partially electrically operated motor vehicle and has a charging port for attaching a charging plug external to the motor vehicle, and the wired interface is formed on the charging port, such that a cable connection for transmitting the first data packet is formed between the motor vehicle and the charging station when charging. In other words, the transmission of the first data packet, in particular, takes place in a charging process of the motor vehicle. In particular, to do so, the charging plug external to the motor vehicle of the charging station can have a corresponding further interface, which corresponds to the wired interface of the communication device. When plugging the charging plug into the charging port of the motor vehicle, a coupling between the communication device and the charging station then takes place. The first data packet is then transmitted from the motor vehicle, in particular from the communication device, to the charging station, which is then, in turn, linked to the base station external to the motor vehicle, such that the first data packet can be further processed there. Thus, the charging times of the at least partially electrically operated motor vehicle can be used, in particular, in order to be able to implement improved mobile telephone network coverage.

Furthermore, it has proved to be advantageous if the motor vehicle is parked for the wired transmission of the first data packet. In other words, the motor vehicle is at a standstill, in particular. In particular, it is thus made possible for the first data packet to advantageously be able to be transmitted, since the motor vehicle itself is not moving. Thus, a stable base station can be provided.

Furthermore, it is advantageous when a femtocell or a picocell is provided by means of the communication device for the mobile device, and the communication device is designed as a base station for the mobile device. In other words, a femtocell or a picocell is formed by the motor vehicle. The mobile devices external to the motor vehicle can then be wirelessly dialed into this femtocell or into this picocell. The communication device is disclosed for the mobile devices as a base station, where the mobile device can dial in. Thus, improved network coverage is made possible.

In a further advantageous embodiment, the second data packet is transmitted unprocessed as the first data packet. In other words, a pure forwarding of the second data packet as the first data packet to the base station external to the motor vehicle takes place. Thus, the motor vehicle, in particular the communication device, serves only as a forwarding device or as an intermediary base station.

Furthermore, it has proved to be advantageous if the communication device has an electronic computing device, which is designed to pass on a completely transmitted first data packet to the base station external to the motor vehicle for further transmission. Should it be established, for example, at the end of charging the motor vehicle that the first data packet is still not completely transmitted, then the motor vehicle passes the possibly still open connection back on to the base station external to the motor vehicle. This can be standardized, in particular, by a protocol. To do so, it can be provided, for example, that the motor vehicle itself transmits by mobile radio if the time is not sufficient when ending the charging process or this has been aborted due to an error. Thus, improved mobile radio coverage can be implemented.

According to a further advantageous embodiment, the electronic computing device is designed to take a stationary time of the motor vehicle into consideration when transmitting the first data packet to the base station external to the motor vehicle. For example, it can be provided that it can be taken into consideration that the vehicle is stationary for an hour, for example when shopping. Furthermore, it can be determined during a charging process of the motor vehicle, for example, as to how long the vehicle is charged. This charging time as stationary time can also be taken into consideration, such that the motor vehicle can be reliably provided as a base station.

A further aspect of the invention relates to a method for transmitting a second data packet from a mobile device external to the motor vehicle to the base station external to the motor vehicle by means of a motor vehicle, in which the second data packet is wirelessly transmitted to a wireless receiving device of a communication device of the motor vehicle.

It is provided that the second data packet is transmitted in a wired manner to the base station external to the motor vehicle by means of a wired interface of the communication device as a first data packet.

According to an advantageous embodiment of the method, an incompletely transmitted first data packet is passed on to the base station external to the motor vehicle by means of an electronic computing device of the communication device for further transmitting.

In a further advantageous embodiment of the method, the motor vehicle is operated at least partially electrically and, in a charging process of the motor vehicle, the cable connection is produced by plugging in a charging plug and, during the charging process, the first data packet will transmit to the base station external to the motor vehicle via a charging station for the motor vehicle.

Advantageous embodiments of the motor vehicle are to be seen as advantageous embodiments of the method. For this, the motor vehicle has objective features which enable the method or an advantageous embodiment thereof. In particular, the method is carried out by means of the motor vehicle.

Further advantages, features and details of the invention emerge from the description below of a preferred exemplary embodiment and by means of the drawing. The features and feature combinations mentioned above in the description and the features and feature combinations mentioned below in the description of the figures and/or shown alone in the single FIGURE can be used not only in the respectively specified combination, but also in other combinations or on their own without leaving the scope of the invention.

BRIEF DESCRIPTION OF THE DRAWING FIGURE

The sole FIGURE shows a schematic side view of an embodiment of a motor vehicle.

The same or functionally identical elements are provided with the same reference numbers in the sole FIGURE.

DETAILED DESCRIPTION

In a schematic side view, the sole FIGURE shows an embodiment of a motor vehicle 10. The motor vehicle 10 has a communication device 12. The communication device 12 has at least one wired interface 14 for transmitting a first data packet 16. The first data packet 16 is transmitted, in particular, to a base station 18 external to the motor vehicle. Furthermore, the communication device 12 has a receiving device 20 for wirelessly receiving a second data packet 22.

It is provided that the receiving device 20 is designed for receiving the second data packet 22 from at least one mobile device 24, 26 external to the motor vehicle, and the communication device 12 is designed to transmit the wirelessly received second data packet 22 as the first data packet 16 in a wired manner.

In particular, the sole FIGURE shows that a first mobile device 24 can be designed as a mobile phone. A second mobile device 26 can be designed as a further motor vehicle.

In particular, it is provided that the motor vehicle 10 is designed as an at least partially electrically operated motor vehicle 10 and has a charging port 28 for attaching a charging plug 30 external to the motor vehicle, and the wired interface 14 is formed on the charging port 28, such that, when charging, a cable connection for transmitting the first data packet 16 is formed between the motor vehicle 10 and a charging station 32.

Furthermore, it is provided, in particular, that the motor vehicle 10 is parked for the wired transmission of the first data packet 16. In particular, the sole FIGURE shows that the motor vehicle 10 is at least partially electrically operated and, during the charging process of the motor vehicle 10, the cable connection is produced by plugging in the charging plug 14 and, when charging, the first data packet 16 is transmitted via the charging station 32 for the motor vehicle 10 to the base station 18 external to the motor vehicle.

It is provided, in particular, that the second data packet 22 is wirelessly transmitted to the wireless receiving device 20 of the communication device 12 of the motor vehicle 10 for transmitting the second data packet 22 from the mobile device 24, 26 external to the motor vehicle to the base station 18 external to the motor vehicle by means of the motor vehicle 10, wherein the second data packet 22 is transmitted in a wired manner to the base station 18 external to the motor vehicle by means of the wired interface 14 of the communication device 12 as the first data packet 16.

In particular, a femtocell or a picocell is provided for the mobile device 24, 26 by means of the communication device 20, and the communication device 20 is designed as a base station for the mobile device 24, 26. The second data packet 22 is here transmitted unprocessed, in particular, as the first data packet 16. In other words, a forwarding of the second data packet 22 as the first data packet 16 to the base station 18 external to the motor vehicle by means of the communication device 12 takes place.

Furthermore, it is provided, in particular, that the communication device 12 has an electronic computing device 34, which is designed to pass on an incompletely transmitted first data packet 16 to the base station 18 external to the motor vehicle for further transmitting.

Furthermore, the electronic computing device 34 can be designed to take a stationary time of the motor vehicle 10, in particular a charging time of the motor vehicle 10, into consideration when transmitting the first data packet 16 to the base station 18 external to the motor vehicle. In other words, it is provided that the incompletely transmitted first data packet 16 is passed on to the base station 18 external to the motor vehicle by means of the electronic computing device 34 of the communication device 12 for further transmission.

In particular, it is thus made possible, for example, for radio shadows from mobile telephone masts to be able to be prevented with the aid of the motor vehicle 10. This is compensated for, in particular, by the use of the motor vehicle 10 as a further base station. In particular, the motor vehicle 10, which can be designed as an electric vehicle, can obtain a quick data connection, in particular the wired data connection, when charging on a charging station 32 via the charging column, whereby mobile radio holes can be compensated for by them functioning temporarily as a mobile radio base station when stationary when charging. Here, the motor vehicle 10 accepts data and, in particular, speech communication of the mobile devices 24, 26 on the mobile radio frequency and forwards these on immediately via the charging cable to the charging station 32, which in turn communicates with the base station 18 external to the motor vehicle.

Here, the motor vehicle 10 uses antennae already present in the motor vehicle 10 and a present mobile radio module in order to identify itself as a base station when charging. Here, the motor vehicle 10 will not evaluate the data or the second data packet 22, but rather send it outwardly only directly via the charging cable. The base station 18, external to the motor vehicle, of the mobile radio provider generally uses an adaptive sending power and will somewhat reduce its own sending strength in this region. Thus, no conflicts emerge as a result of simultaneous transmission on the same frequency. At the end of charging, the motor vehicle 10 passes connections possibly still open back to the base station 18 external to the motor vehicle. This can also be standardized, in particular, in protocol. To do so, it can be provided, for example, that the motor vehicle 10 itself transmits by mobile radio if there is not sufficient time when ending the charging process or this has been aborted due to an error. Since the motor vehicle antennae clearly allow more sending power than a mobile radio telephone, for example, a power reduced by the real base station, i.e., the base station 18 external to the motor vehicle, in the region for this process is not a problem.

In particular, better coverage of topographically difficult areas with mobile radio technology can thus be implemented. Furthermore, a better capacity of the motor vehicle 10 can be implemented.

Furthermore, it can thus be implemented that the motor vehicle 10, for example, or the further motor vehicle 26 are connected via a network according to the mesh standard. Here, all available types of connection, for example WLAN, mobile radio, and/or Ethernet are treated equally and the respectively expedient is used and shared with all other participants of the mesh network. When a parked car, for example, in this case the motor vehicle 10, just has a wire-bound connection to the internet, for example via the charging column, then vehicles within range can also use this line via WLAN, for example, instead of the mobile radio connection. For example, it can be provided, should the same data packet already have been downloaded by the motor vehicle 10, then this can, in turn, provide further motor vehicles 26 within range with this data packet.

Up- and downlinks are also provided by this crosslinking of the motor vehicles 10, 26 and thus a speed- and cost-improved connection is produced for the motor vehicles 10, 26.

Overall, the invention shows the motor vehicle 10 on the charging station 32, which is designed as an access point or base station.

The invention claimed is:
1. A motor vehicle, comprising:
a communication device configured to transmit and receive data packets, wherein the communication device has a wired interface configured to transmit a first data packet to a base station external to the motor vehicle and at least one receiving device configured to wirelessly receive a second data packet, wherein the base station external to the motor vehicle is configured to receive data packets via a mobile telephone frequency and the communication device is configured to wirelessly receive second data packet via the mobile telephone frequency,
wherein the receiving device is configured to receive the second data packet from at least one mobile device external to the motor vehicle via a first connection, and the communication device is configured to forward the wirelessly received second data packet unprocessed over the wired interface as the first data packet,
wherein the motor vehicle is an at least partially electrically operated motor vehicle and includes a charging port configured for attaching a charging plug external to the motor vehicle, and the wired interface is formed on the charging port such that, when charging the motor vehicle, a cable connection is formed to transmit the first data packet between the motor vehicle and a charging station,
wherein the motor vehicle is configured to determine that the charging the motor vehicle has ended and that a data packet wirelessly received from the at least one mobile device via the mobile telephone frequency and the first connection was not completely transmitted by the communication device to the base station via the wired interface, wherein the communication device is configured to pass the first connection to the base station external to the motor vehicle responsive to the determining that the charging the motor vehicle has ended, and wherein the communication device is configured to wirelessly transmit, to the base station using the mobile telephone frequency, the data packet wirelessly received via the mobile telephone frequency from the at least one mobile device that was not completely transmitted by the communication device to the base station via the wired interface.

2. The motor vehicle of claim 1, wherein the motor vehicle is parked for transmission of the first data packet over the wired interface.

3. The motor vehicle of claim 1, wherein the communication device is configured to generate a femtocell or a picocell for the at least one mobile device external to the motor vehicle by acting as a base station for the at least one mobile device external to the motor vehicle.

4. The motor vehicle of claim 1, wherein the communication device has an electronic computing device configured to pass an incompletely transmitted first data packet to the base station external to the motor vehicle for further transmission.

5. The motor vehicle of claim 4, wherein the electronic computing device is configured to account for a stationary time of the motor vehicle when transmitting the first data packet to the base station external to the motor vehicle.

6. The motor vehicle of claim 1, wherein the communication device is configured to simultaneously transmit on a same frequency as the base station external to the motor vehicle.

7. A method, comprising:
    establishing a coupling between a motor vehicle and a charging station by plugging a charging plug of the charging station into a charging port of the motor vehicle, wherein the charging port includes a wired interface;
    charging the motor vehicle via the charging plug, wherein, during the charging of the motor vehicle the method further comprises
        wirelessly receiving, by a wireless receiving device of a communication device of the motor vehicle, a first data packet on a first connection from a mobile device external to the motor vehicle via a mobile telephone frequency; and
        forwarding, by the wired interface over a wired connection with a base station external to the motor vehicle and via the charging plug, a second data packet unprocessed as the first data packet to the base station external to the motor vehicle, wherein the base station external to the motor vehicle receives data packets via the mobile telephone frequency;
    determining that charging the motor vehicle has ended and that a data packet wirelessly received from the mobile device via the mobile telephone frequency and the first connection was not completely transmitted by the communication device to the base station via the wired interface;
    passing the first connection to the base station external to the motor vehicle responsive to the determining that the charging the motor vehicle has ended; and
    wirelessly transmitting, to the base station using the mobile telephone frequency, the data packet wirelessly received via the mobile telephone frequency from the at least one mobile device that was not completely transmitted by the communication device to the base station via the wired interface.

8. The method of claim 7, wherein an incompletely transmitted first data packet is passed on to the base station external to the motor vehicle by an electronic computing device of the communication device for further transmission.

9. The method of claim 7, wherein the motor vehicle is parked for transmission of the first data packet over the wired interface.

10. The method of claim 7, wherein the motor vehicle generates a femtocell or a picocell for the mobile device external to the motor vehicle by acting as a base station for the mobile device external to the motor vehicle.

11. The method of claim 7, wherein the communication device has an electronic computing device configured to pass an incompletely transmitted first data packet to the base station external to the motor vehicle for further transmission.

12. The method of claim 11, wherein a stationary time of the motor vehicle is taken into account when transmitting the first data packet to the base station external to the motor vehicle.

13. The method of claim 7, wherein the communication device simultaneously transmits on a same frequency as the base station external to the motor vehicle.

14. A method, comprising:
    establishing a coupling between a motor vehicle and a charging station by plugging a charging plug of the charging station into a charging port of the motor vehicle, wherein the charging port includes a wired interface;
    charging the motor vehicle via the charging plug, wherein, during the charging of the motor vehicle the method further comprises
        identifying, by the motor vehicle via a mobile telephone frequency, the motor vehicle as a base station;
        establishing, between the motor vehicle and a plurality of mobile devices external to the motor vehicle, a wireless connection;
        forwarding, by vehicle over a wired connection with a base station external to the motor vehicle and via the charging plug, data packets received over the wireless connections with the plurality of mobile devices external to the motor vehicle, wherein the vehicle does not process the data packets before forwarding;
    determining, by the motor vehicle, that charging the motor vehicle has ended and that a data packet wirelessly received from the mobile device via the mobile telephone frequency and the first connection was not completely transmitted by the communication device to the base station via the wired interface;
    passing, by the motor vehicle, the wireless connections with the plurality of mobile devices external to the motor vehicle to the base station external to the motor vehicle responsive to the determining that the charging the motor vehicle has ended; and
    wirelessly transmitting, to the base station using the mobile telephone frequency, the data packet wirelessly received via the mobile telephone frequency from the at least one mobile device that was not completely transmitted by the communication device to the base station via the wired interface.

15. The method of claim 14, wherein the motor vehicle generates a femtocell or a picocell for the plurality of mobile devices external to the motor vehicle by acting as a base station for the plurality of mobile devices external to the motor vehicle.

16. The method of claim 14, wherein an incompletely transmitted first data packet is passed to the base station external to the motor vehicle for further transmission.

17. The method of claim 14, wherein a stationary time of the motor vehicle is taken into account when forwarding the data packets to the base station external to the motor vehicle.

18. The method of claim 14, wherein the motor vehicle simultaneously transmits on a same frequency as the base station external to the motor vehicle.

* * * * *